(No Model.) 2 Sheets—Sheet 1.

W. T. STEWART.
APPARATUS FOR THE MANUFACTURE OF GAS.

No. 409,761. Patented Aug. 27, 1889.

WITNESSES
C. M. Clarke
T. W. Bakewell

INVENTOR.
William T. Stewart

N. PETERS, Photo-Lithographer, Washington, D. C.

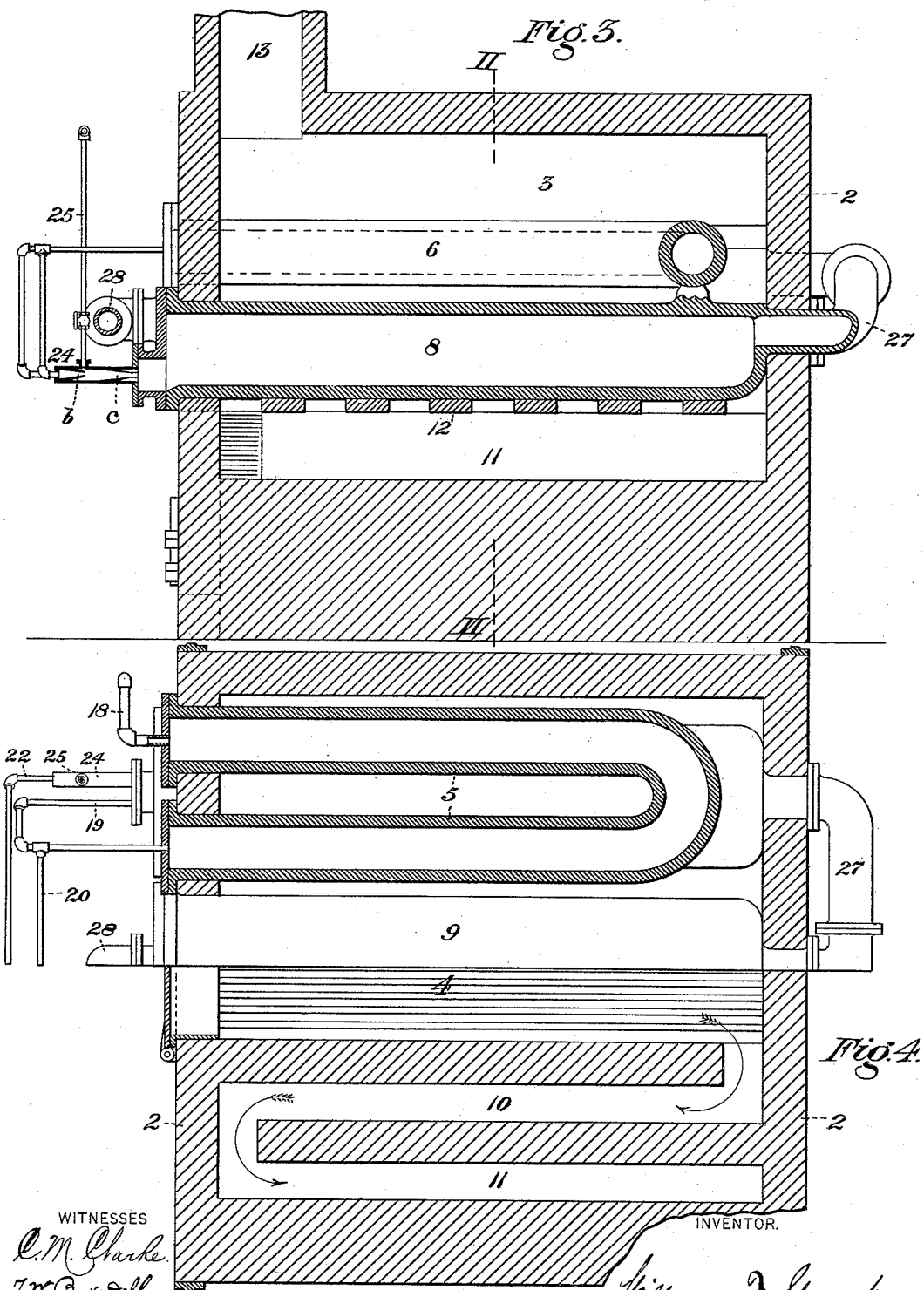

UNITED STATES PATENT OFFICE.

WILLIAM T. STEWART, OF PITTSBURG, PENNSYLVANIA, ASSIGNOR OF THREE-FOURTHS TO WILLIAM H. DENNISTON, OF SAME PLACE.

APPARATUS FOR THE MANUFACTURE OF GAS.

SPECIFICATION forming part of Letters Patent No. 409,761, dated August 27, 1889.

Application filed January 18, 1889. Serial No. 296,737. (No model.)

*To all whom it may concern:*

Be it known that I, WILLIAM T. STEWART, of Pittsburg, in the county of Allegheny and State of Pennsylvania, have invented a new and useful Improvement in Apparatus for the Manufacture of Gas, of which the following is a full, clear, and exact description, reference being had to the accompanying drawings, forming part of this specification, in which—

Figure 1:
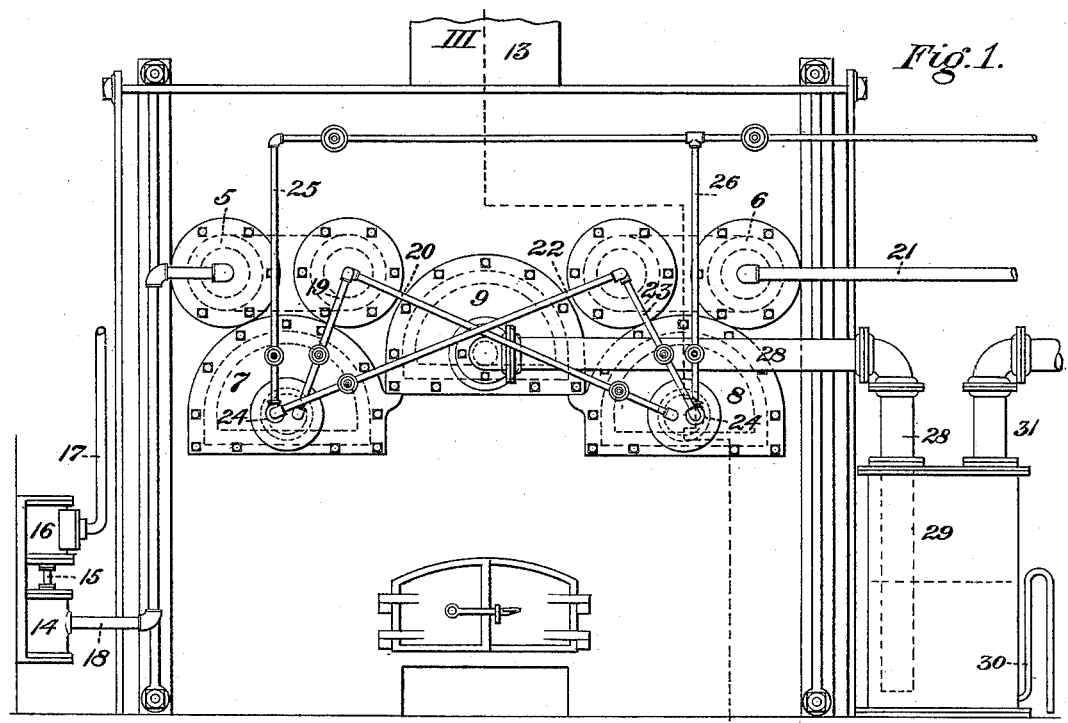
Figure 2:
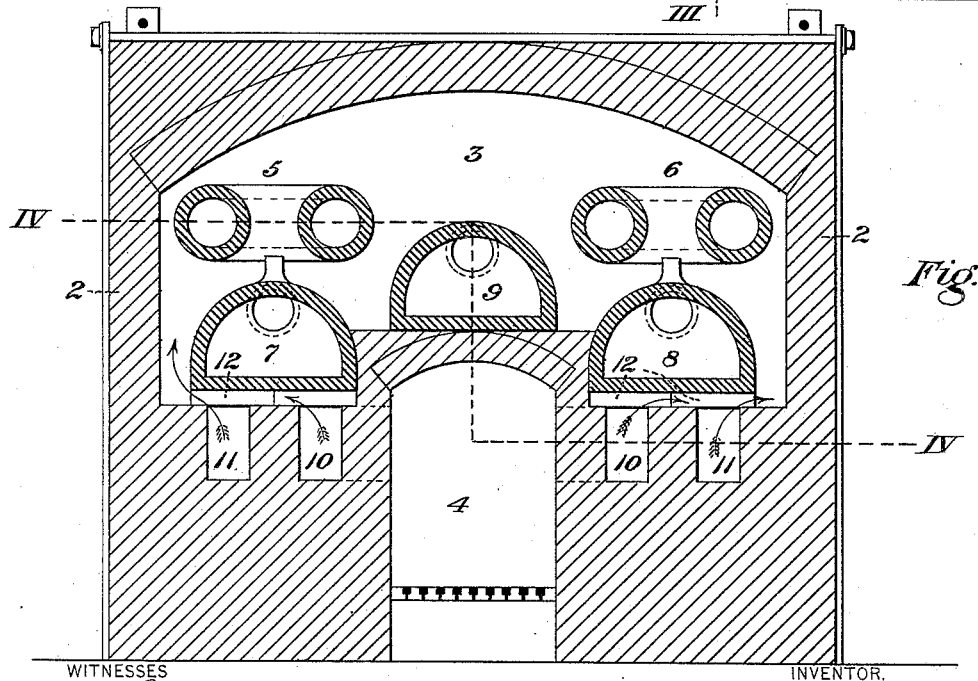

Figure 1 is a front elevation of my improved apparatus. Fig. 2 is a vertical section on the line II II of Fig. 3. Fig. 3 is a vertical irregular section on the line III III of Fig. 1. Fig. 4 is a horizontal irregular section on the line IV IV of Fig. 2.

Like symbols of reference indicate like parts in each.

In the drawings, 2 represents the setting or walls of my improved apparatus.

3 is the chamber containing the retorts or generators, and 4 is the combustion-chamber. The chamber 3 contains the following retorts or sub-chambers: A pair of chambers 5 6, each of which is made, preferably, of U form, extending from the front wall of the chamber 3 to or nearly to the back wall, a pair of retorts 7 8, each of which is arranged beneath one of the retorts 5 6, and a retort 9, which is preferably situated at the middle of the chamber 3, above the combustion-chamber 4. The retorts 7 and 8 are preferably made of cast-iron, open at their front ends, and are provided with removable caps or cover plates *b*, which are secured to the open ends by bolts *c*. The arrangement of flues leading from the combustion-chamber 4 into the chamber 3 is as follows: At each side of the combustion-chamber are flues 10 11, both of which sets of flues are shown in Fig. 2, and one of which is shown in Fig. 4. The flues 10 communicate with the combustion-chamber at the rear end thereof and extend horizontally parallel therewith, and the flues 11 connect with the flues 10 at the front ends thereof. The flues 10 and 11 underlie the retorts 7 and 8, and are separated therefrom by tiles 12, which thus form parts of the floor of the chamber 3, and which are separated so as to leave interstitial spaces, through which the heated products of combustion in the flues 10 and 11 have direct access to the floors of the retorts 7 and 8. The flame and products of combustion from the combustion-chamber 4 pass through the flues 10 and 11, and in their passage through the flues 11 escape upward through the interstices of the tiles 12 into the chamber 3, through which they circulate, and from which they finally emerge through the stack 13, thus heating all the retorts or sub-chambers before mentioned in a most thorough manner.

I shall now describe the manner in which the retorts are supplied with the elements from which the gas is made.

14 is the air-cylinder of an air-pump, the piston-rod 15 of which is operated by a steam-engine 16, which derives its steam from a supply-pipe 17. The delivery-pipe 18 of the air-pump 14 leads into the end of one of the branches of the curved retort 5, and from the end of the other branch thereof pipes 19 and 20 lead to the front ends of the retorts 7 and 8, respectively.

21 is a steam-supply pipe which enters the end of one branch of the retort 6, and 22 and 23 are pipes which lead from the end of the other branch thereof to the front ends of the retorts 7 and 8, where they terminate in injectors or siphon-nozzles 24, one of which is shown in Fig. 3. These injectors are provided with tapering nozzles *b*, which communicate directly with the steam-supply pipe and with a larger tapering nozzle *c* in advance thereof, into which enters a pipe which supplies hydrocarbon liquid, preferably crude petroleum. These oil-supply pipes are shown in Figs. 1 and 3, where they are designated by the reference-figures 25 and 26. Each of the retorts 7 and 8 communicates with the rear end of the retort 9 by a branch connection or pipe 27, Figs. 3 and 4. From the front end of the retort 9 a delivery-pipe 28 leads directly to the furnace or other place of use of the gas, or indirectly through a washer 29, which may be partially filled with water and provided with the usual overflow-pipe 30. From thence the gas is taken through a pipe 31, either to holders or scrubbers and purifiers or to suitable furnaces.

In using my improved apparatus a fire is kindled in the combustion-chamber 4, so as to heat up the chamber 3 and the several retorts which are situate therein, as hereinbefore explained. When these have been raised to a high heat, the air-pump 14 is started into action, steam is caused to pass through the pipe 21, and oil is passed through the pipes 25 and 26. The air passes through the double retort 5, becoming highly heated in its passage, and thence through the pipes 19 and 20 enters the retorts 7 and 8. In like manner the steam is superheated by passing through the double retort 6, and is discharged into the injectors 24 from the nozzles $b$, in which it induces a supply of oil from the pipes 25 and 26, and the steam and oil-spray enter the retorts 7 and 8, where they mingle with the air from the pipes 19 and 20 and are heated, and the air and steam, being preheated before their admission into these retorts, unite with the oil to form a gas. From the retorts 7 and 8 the gases pass into the retort 9, where they are further heated and fixed, and from the retort 9 they pass through the pipe 28, as before explained.

There is a certain quantity of the less volatile constituents of the crude oil which will deposit in a liquid form in the retorts 7 and 8, and unless some means were afforded for converting this into gas it would not only be wasted, but would clog up the retorts so as to impede the working of the apparatus. The pressure of the incoming air and gas in the retorts 7 and 8 is however sufficient to carry this residuum up through the branch pipes 27 into the secondary retort 9, where the heat to which it is subjected causes it to unite with the air and steam to form a gas. In this manner I utilize all the oil introduced into the apparatus, and thereby render my apparatus very economical.

The gas produced by means of my improved apparatus is of very fine quality, and may be used either for illuminating purposes or as fuel-gas. When it is desired to produce fuel-gas, I prefer to supply the air and steam to the apparatus at a greater pressure than when illuminating-gas is to be produced. Very good results are produced by supplying the air at about eight pounds and the steam at about twenty pounds pressure to the square inch for making illuminating-gas, and the air at about ten pounds and the steam at about sixty pounds pressure for making fuel-gas.

I claim—

1. In apparatus for the manufacture of gas, the combination, with a furnace or oven and with each other, of a series of five retorts, two of the series being U-shaped superheaters, two of the series gasifying-retorts, and one a fixing-retort, one of the said U retorts or superheaters being connected directly with each of the gasifying-retorts, and the other of said U retorts or superheaters being connected with each of the gasifying-retorts by means of intermediate oil-injectors, and each of the gasifying-retorts being connected with the fixing-retort, substantially as and for the purposes described.

2. In apparatus for making gas, the combination, with an oven having a central fire-chamber and reflex-flues parallel therewith, of two gasifying-retorts, a series of spaced tiles for supporting said retorts above the parallel flues which connect the fire-chamber and oven, and a fixing-retort arranged between the gasifying-retorts and over the fire-chamber, substantially as and for the purposes described.

3. In apparatus for making gas, the combination, with an oven, a central fire-chamber therefor, and parallel reflex-flues which connect the fire-chamber and oven, of two gasifying-retorts located over the reflex-flues of the fire-chamber, a fixing-retort located intermediate of the gasifying-retorts and over the central fire-chamber, and superheaters located within the oven and over the gasifying-retorts, substantially as and for the purposes described.

4. In apparatus for the manufacture of gas, the combination, with a furnace and oven communicating with each other by parallel reflex-flues, of two U-shaped superheating-retorts, two gasifying-retorts, and a fixing-retort, one end of one of the U-shaped retorts being connected with an air-pump and the other end with each of the gasifying-retorts by pipes 19 and 20, and the other U-shaped retort connected at one end with a steam-supply, and at the other end with each of the gasifying-retorts by means of pipes 22 and 23 and intermediate oil-injectors 24, and each of the gasifying-retorts communicating with the fixing-retorts by pipes 27, substantially as and for the purposes described.

5. In apparatus for the manufacture of gas, the combination, with an oven having a central fire-chamber and reflex-flues parallel therewith, of two U-shaped superheating-retorts, two gasifying-retorts located on opposite sides of the fire-chamber above the reflex-flues, and a fixing-retort arranged over the fire-chamber, one of said superheaters connected at one end with an air-supply and at the other end with each of the gasifying-retorts by valved pipes 19 and 20, the other superheater connected at one end with a steam-supply and at its other end with each of the gasifying-retorts by valved pipes 22 and 23 and intermediate oil-injector 24, and each of the gasifying-retorts communicating with the fixing-retort by pipes 27, substantially as and for the purposes described.

In testimony whereof I have hereunto set my hand this 10th day of January, A. D. 1889.

WILLIAM T. STEWART.

Witnesses:
 W. B. CORWIN,
 THOMAS W. BAKEWELL.